US 8,625,853 B2

(12) United States Patent
Carbonell et al.

(10) Patent No.: US 8,625,853 B2
(45) Date of Patent: Jan. 7, 2014

(54) PARKING LOT INFORMATION SYSTEM USING IMAGE TECHNOLOGY FOR IDENTIFYING AVAILABLE PARKING SPACES (75) Inventors: Lee A. Carbonell, Flower Mound, TX (US); Tsz Cheng, Grand Prairie, TX (US); Jeffrey L. Edgington, Keller, TX (US); Pandian Mariadoss, Allen, TX (US)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 13/208,336

(22) Filed: Aug. 11, 2011

(65) Prior Publication Data
US 2013/0039532 A1 Feb. 14, 2013

(51) Int. Cl.
*G06K 9/00* (2006.01)
(52) U.S. Cl.
USPC .......................................... 382/104
(58) Field of Classification Search
USPC .......... 382/100–107; 340/907–910, 933–935; 348/113
See application file for complete search history.

(56) References Cited

U.S. PATENT DOCUMENTS

| 4,808,997 | A | 2/1989 | Barkley et al. |
| 5,933,531 | A | 8/1999 | Lorie |
| 6,229,455 | B1 | 5/2001 | Yost et al. |
| 6,285,297 | B1 * | 9/2001 | Ball ........................... 340/932.2 |
| 6,917,307 | B2 * | 7/2005 | Li ............................... 340/932.2 |
| 7,123,166 | B1 | 10/2006 | Haynes et al. |
| 7,295,694 | B2 | 11/2007 | Moon et al. |
| 7,701,361 | B2 | 4/2010 | Lee et al. |
| 2004/0233036 | A1 | 11/2004 | Sefton |
| 2007/0057817 | A1 * | 3/2007 | Aman .......................... 340/933 |
| 2009/0303079 | A1 | 12/2009 | Khim |
| 2010/0211267 | A1 | 8/2010 | Shimazaki et al. |
| 2010/0271480 | A1 * | 10/2010 | Bezborodko ................. 348/148 |
| 2010/0309024 | A1 | 12/2010 | Mimeault |
| 2012/0062395 | A1 * | 3/2012 | Sonnabend et al. ....... 340/932.2 |

* cited by examiner

*Primary Examiner* — Atiba O Fitzpatrick
(74) *Attorney, Agent, or Firm* — Patents on Demand; Brian K. Buchheit; Scott M. Garrett (57) ABSTRACT A parking lot information system comprising a digital camera for obtaining an image of parking spaces in the parking lot where each parking space is marked with a visual identifier, a computer coupled to the digital camera for identifying available parking spaces by recognizing the identifiers marking the available parking spaces, and a display coupled to the computer for displaying information on the available parking spaces.

20 Claims, 7 Drawing Sheets

PARKING LOT INFORMATION SYSTEM USING IMAGE TECHNOLOGY FOR IDENTIFYING AVAILABLE PARKING SPACES

BACKGROUND

The invention relates generally to parking lots, and more particularly, to a parking lot information system that uses image technology to identify available parking spaces and provide information on the parking lot to local and remote customers.

Parking lots (or parking garages) have been used for years at various locations, ranging from shopping malls to airports. A typical parking lot remains basically the same over the years. A customer generally receives a ticket with a timestamp at a parking lot entrance or an electronic toll tag attached to the car is read by a tag reader when the car enters the parking lot. The customer then often drive by rows of parked cars in the parking lot to find an available parking space. When the customer later returns to the parking lot to retrieve the car, the customer would need to find the original parking space where the car was parked. As the customer exits through a gate of the parking lot, the customer presents the parking ticket to a parking lot attendant to pay for the parking duration, or an automated reader reads the electronic toll tag of the car and charges the customer for the parking.

Customers often have a difficult time in finding available parking spaces in parking lots, especially if the parking lots are relatively large or almost full. In addition, a customer may not remember exactly where the car was parked and may need to pay the maximum parking fees if the customer loses the parking ticket.

BRIEF SUMMARY

The invention relates to a system, computer-implemented method, and computer program product for identifying available parking spaces in a parking lot or parking garage, tracking the status of parking spaces, and providing parking lot information to on-site and remote customers.

In one exemplary embodiment of the invention, a system comprises a plurality of visual identifiers each marking a parking space in a parking lot, a digital camera for obtaining an image of parking spaces in the parking lot, a computer coupled to the digital camera for identifying available parking spaces by recognizing the identifiers marking the available parking spaces, and a display coupled to the computer for displaying information on the available parking spaces.

In a second exemplary embodiment of the invention, a computer implemented method comprises obtaining an image of a parking lot by a camera, wherein the parking lot includes parking spaces marked by space identifiers; identifying available parking spaces in the parking lot by recognizing the identifiers marking the available parking spaces using a camera coupled to the computer; and displaying information on the available parking spaces to on-site and remote customers.

In a third exemplary embodiment of the invention, a computer program product comprises a computer readable storage medium having computer readable program code embodied therewith. The computer readable program code comprises computer readable program code configured to obtain an image of a parking lot by a camera, wherein the parking lot includes parking spaces marked by space identifiers; computer readable program code configured to identify available parking spaces in the parking lot by recognizing the identifiers marking the available parking spaces, using a computer coupled to the camera; and computer readable program code configured to display information on the available parking spaces to on-site and remote customers.

The details of the preferred embodiments of the invention, both as to its structure and operation, are described below in the Detailed Description section in reference to the accompanying drawings, in which like reference numerals refer to like parts. The Brief Summary is intended to identify key features of the claimed subject matter, but it is not intended to be used to limit the scope of the claimed subject matter.

DETAILED DESCRIPTION

The invention relates generally to parking lots and parking garages. More particularly, the invention concerns a system, method, and computer program product for identifying and displaying available parking spaces in a parking lot, tracking of the parking spaces, and providing information on the parking spaces to on-site and remote customers.

In current parking lots, a driver may experience difficulties and delays in finding an available parking space, especially if a parking lot is relatively large and is almost full. Upon returning to the parking lot to retrieve the car, the driver may not remember the space where the car was parked and would have to pay for the delay in finding the car, or pay the maximum fees if the customer loses the parking ticket. Further, a parking lot company may charge the same rate for all of the parking spaces regardless of the convenience of the individual spaces to the customers. This is because the company would not know which parking space is used and for how long.

To better track the available parking spaces, the parking lot company may have an attendant record the parking space of a parked car or install a sensor to monitor each parking space. However, these approaches may not be practical due to their costs and other overheads. Embodiments of the invention provide an efficient system and method for quickly identifying and displaying available parking spaces in a parking lot to customers at any given time, directing customers to the available parking spaces, and tracking the occupancy of parking spaces in the parking lot to provide up-to-date information to on-site customers and remote customers through a computer network such as the Internet.

Figure 1:
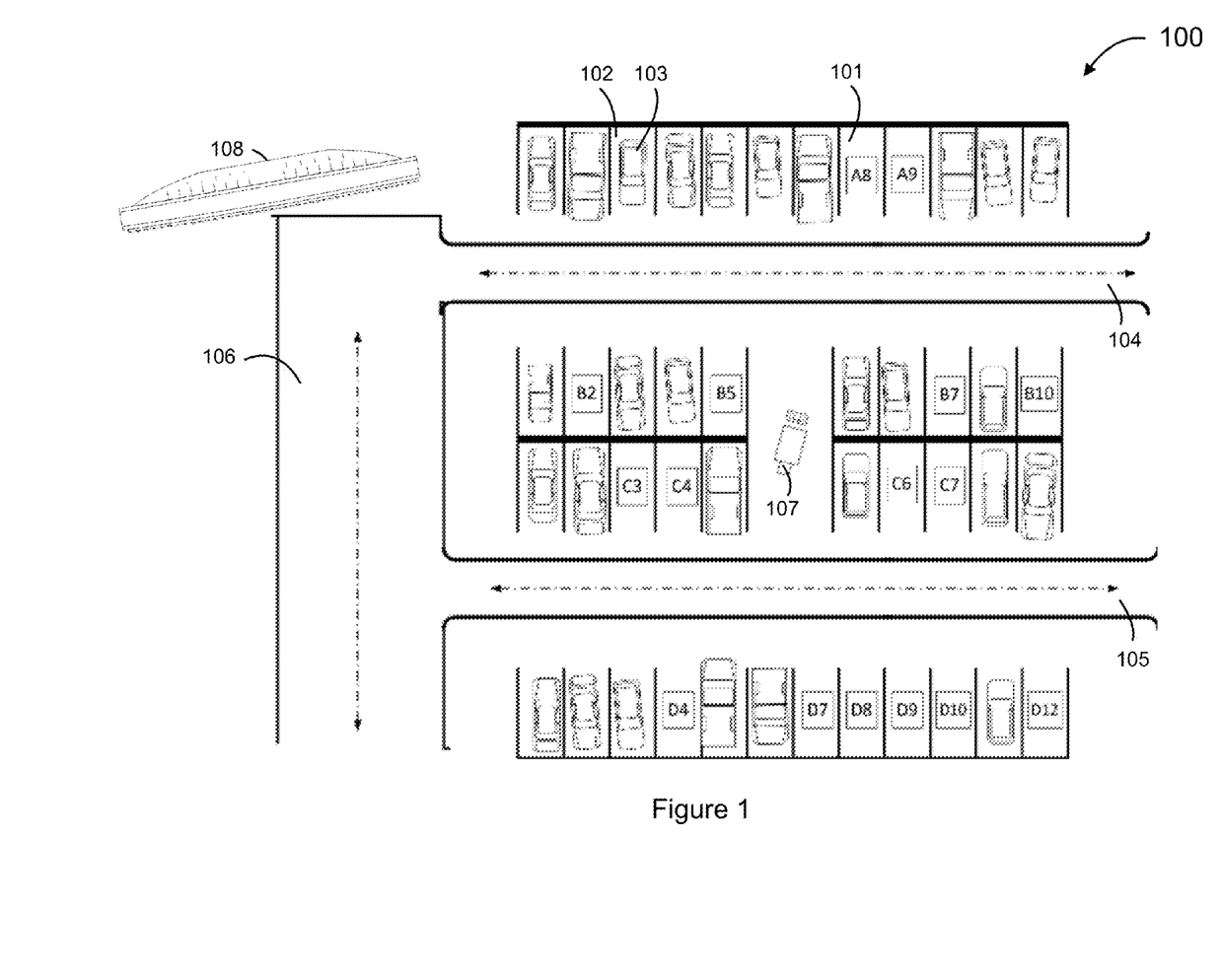
FIG. 1 is a diagram illustrating a parking lot or parking garage in which embodiments of the invention may be provided.

Referring now to FIG. 1, there is illustrated a diagram of a parking lot or parking garage in which embodiments of the invention may be provided. The parking garage 100 includes individual parking spaces 101-102. As an example, the parking space 102 is currently occupied by a car 103 while parking space 101 is currently vacant and available to the drivers for parking. Drivers may enter the parking lot 100 through a main lane 106 and turn onto side lanes 104 and 105 to reach available parking spaces 101-102. When exiting the parking lot 100, the drivers again may use the main lane 106 to reach a parking lot exit.

In an exemplary embodiment of the invention, one or more camera 107 may be installed at appropriate locations in the parking lot 100 to provide a full view coverage of all the parking spaces in the parking lot 100. For example, multiple cameras 107 may be strategically positioned between two adjacent rows of parking spaces and at the ends of the rows to provide images of all of the parking spaces in these two rows. Cameras 107 may also be installed at the corners of the parking lot 100 to provide wide angle views of the parking lot 100.

The cameras 107 may be connected to a computer (not shown) located away from the parking spaces to minimize damages to the computer due to dust and heat in the parking lot 100. The connection between the cameras 107 and the computer may be through a video cable or a computer network. This computer may include a computer implementation that provides aspects of the invention, as described with reference to FIGS. 2-6. One or more display 108 may be strategically positioned in the parking lot 100 to provide information on the currently available parking spaces and other relevant parking information to the drivers. The display 108 may be connected to the computer that provides embodiments of the invention through a video display cable.

Figure 2:
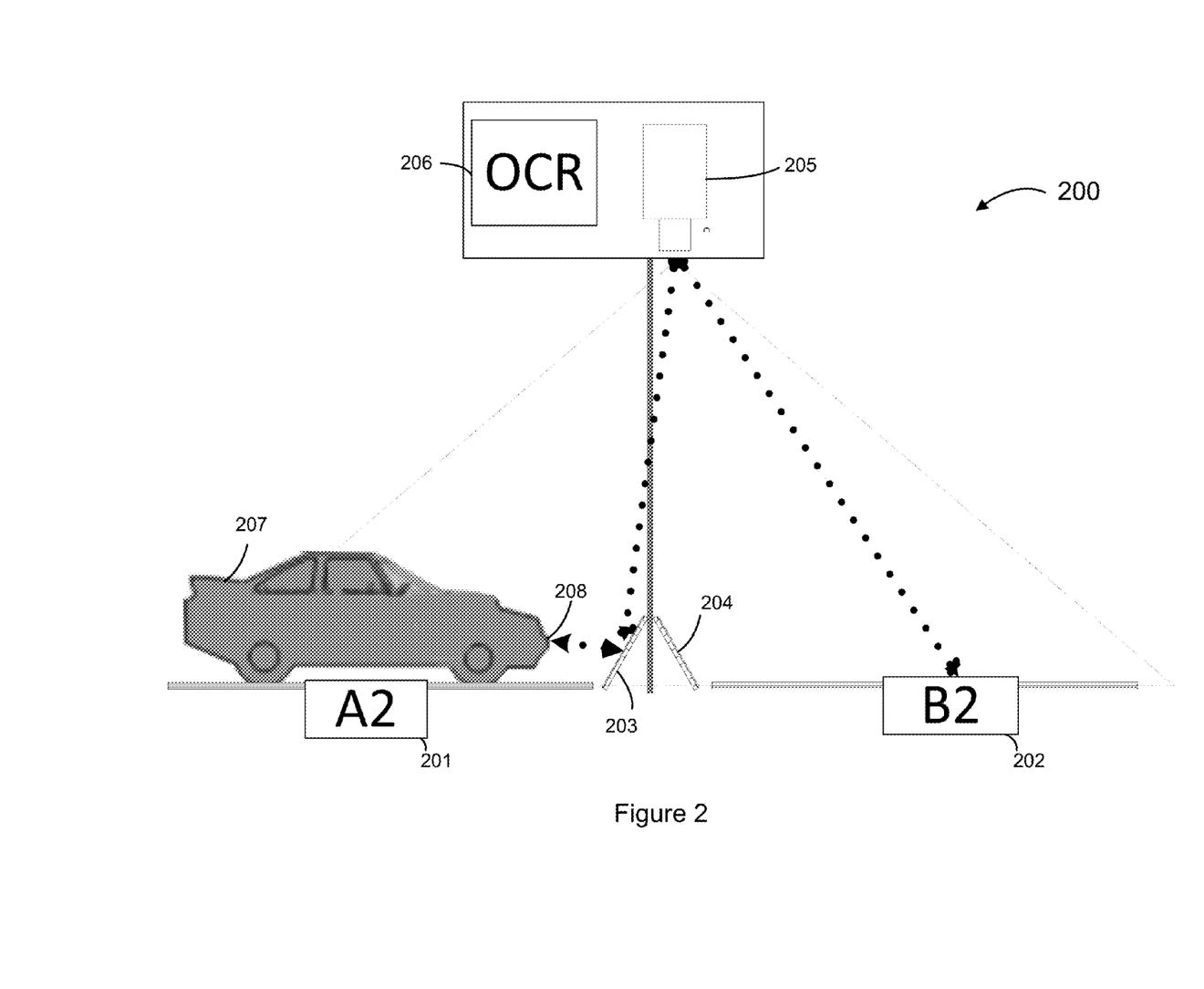
FIG. 2 is a block diagram illustrating a camera and mirror arrangement for sending an image of a parked car's license plate to the parking lot information system, according to an embodiment of the invention.

FIG. 2 is a block diagram illustrating a camera and mirror arrangement for sending an image of the license plates of parked cars in a parking lot to a parking lot information system, according to an embodiment of the invention. As an example, FIG. 2 shows two adjoining parking spaces 201 and 202. The parking space 201 is occupied by a car 207 while parking space 202 is currently unoccupied and available to customers for parking. As an example, camera 205 may be positioned above a wall that separates the adjoining parking spaces 201 and 202. A mirror 203 may be appropriately positioned to reflect an image of the license plate of parked car 207 to the camera 205. Similarly, a mirror 204 may be provided to reflect an image of the license plate of another car when this car is parked in the opposite space 202. To protect the mirrors 203-204 from accidental breakage, they may be installed within protecting enclosures with small openings to receive and send reflected images of the license plates of the parked cars.

While the car 207 is parked in the parking space 201, the car 207 may be on top of the parking space identifier A2 that marks the space 201 and thus block the direct view of the space identifier A2 from the camera 205. The camera 205, however, can still receive an image of a license plate 208 of car 207 from a reflected view of the license plate 208 by mirror 203. Mirror 203 may be appropriately positioned near the parking space 201 and associated with the parking space identifier A2 marking the parking space 201. The camera 205 and optical character recognition system 206 thus can recognize car 207 as being parked in the parking space 201.

On the other hand, the parking space 202 is currently vacant and available to customers for parking. The camera 205 has a direct view of the parking space identifier B2 that marks the parking space 202, as the space identifier B2 is not blocked by a parked card, and does not need to use mirror 204 to view a car license plate.

Figure 3:
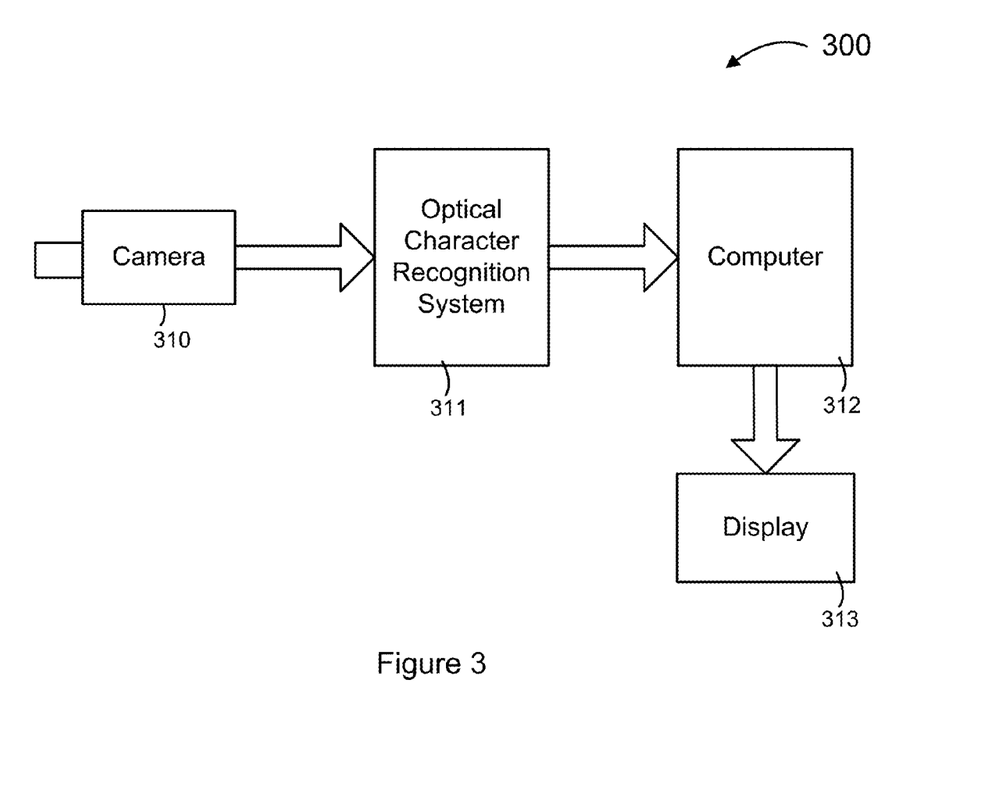
FIG. 3 is a block diagram illustrating a parking lot information system for identifying available parking spaces in a parking lot, tracking and displaying information on the parking spaces, according to an exemplary embodiment of the invention.

FIG. 3 is a block diagram illustrating a parking lot information system 300 for identifying and displaying available parking spaces in a parking lot, and tracking parking spaces, according to an exemplary embodiment of the invention. The parking lot information system 300 may include one or more digital camera 310 which may be connected to an optical character recognition system 311 to recognize the identifiers marking the parking spaces in the parking lot. The camera 310 may be a high definition wide-angle camera to provide a broad coverage of the parking lot and allow the camera to zoom into parts of a view of the parking lot. In one embodiment of the invention, the camera 310 is capable of creating separate video streams for portions of a view of the parking lot. The parking lot information system 300 may then relate the video streams to parts of the parking lot in processing information on the individual parking spaces.

The optical character recognition system 311 may employ a character recognition process as described in U.S. Pat. No. 7,295,694 for "MICR-based Optical Character Recognition System And Method" by R. Moon et al. and U.S. Pat. No. 5,933,531 for "Verification And Correction Method And System For Optical Character Recognition" by R. Lorie, which are hereby incorporated by reference. The optical character recognition system 311 may be connected to a computer 312 such as a server or a laptop computer. The computer 312 may display parking information to drivers and other customers on one or more displays 313. In one embodiment, multiple displays 313 may be positioned in appropriate locations in the parking lot to provide up-to-date information on available parking spaces to on-site drivers in the parking lot.

Figure 4:
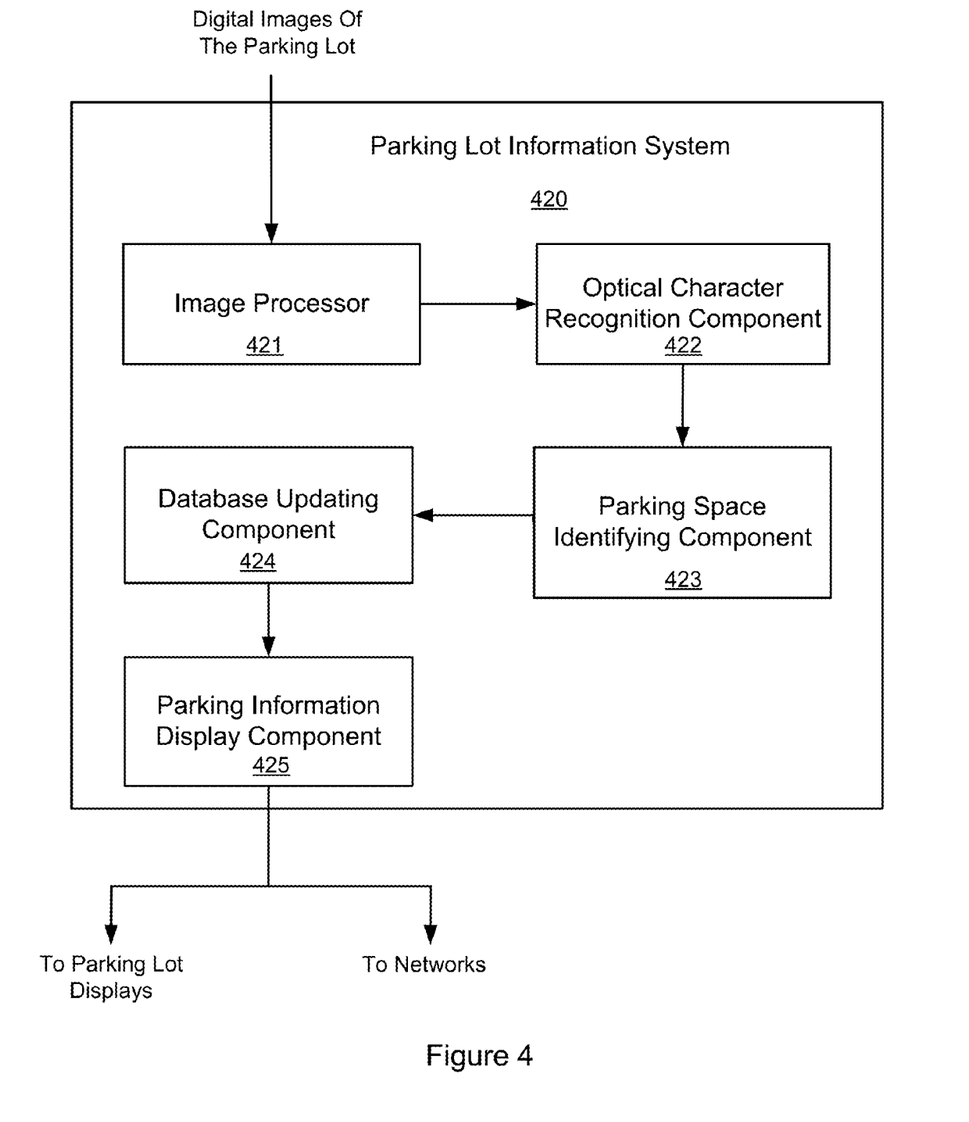
FIG. 4 is a block diagram showing components of a parking lot information system, according to an exemplary embodiment of the invention.

FIG. 4 is a block diagram illustrating components of a parking lot information system, according to an exemplary embodiment of the invention. The parking lot information system 420 may include an image processor 421 for receiving images of individual parking spaces in a parking lot, for example, from digital cameras 205 installed throughout the parking lot. The image processor 421 may enhance the quality of the received images using an image enhancement process known in the art. In addition, the image processor 421 may dissect the images and organize the images to facilitate the identification of the individual parking spaces and the space identifiers.

The parking lot processor 420 may employ an optical character recognition component 422 to better recognize characters in the parking space identifiers from the images received from the camera 205. Optical character recognition processes are described, for example, in U.S. Pat. No. 7,295,694 for "MICR-based Optical Character Recognition System And Method" by R. Moon et al. and U.S. Pat. No. 5,933,531 for "Verification And Correction Method And System For Optical Character Recognition" by R. Lorie, which are herein incorporated by reference.

Once the optical character recognition component 422 has recognized characters from the parking space markers, the parking space identifying component 423 may correlate the identified parking space markers with the parking spaces in the parking lot, including occupied spaces and available spaces. Information on the parking spaces in the parking lot may be maintained in a database that the parking lot information system 400 has access to. The information on each parking space may include its location in the parking lot and other characteristics, and its up-to-date occupancy status.

The parking lot information system 420 may include a database updating component 424 for updating the parking lot information database with the current status of each parking space in the parking lot based on information from the identifying component 423. For example, each parking space may have the status of "available" (or "unoccupied"), "unavailable" (or "occupied"), or "out-of-order". The parking lot information system 420 may transmit the updated information on the parking spaces to displays 108 and 313 located throughout the parking lot, or to remote customers via computer networks that the parking lot information system is connected to. In example scenarios, customers at remote locations may check on the availability of parking spaces or the number of available parking spaces in the parking lot 100 through computers at work, at home, or through smartphones and portable computers while on the road, before reaching the parking lot.

Figure 5:
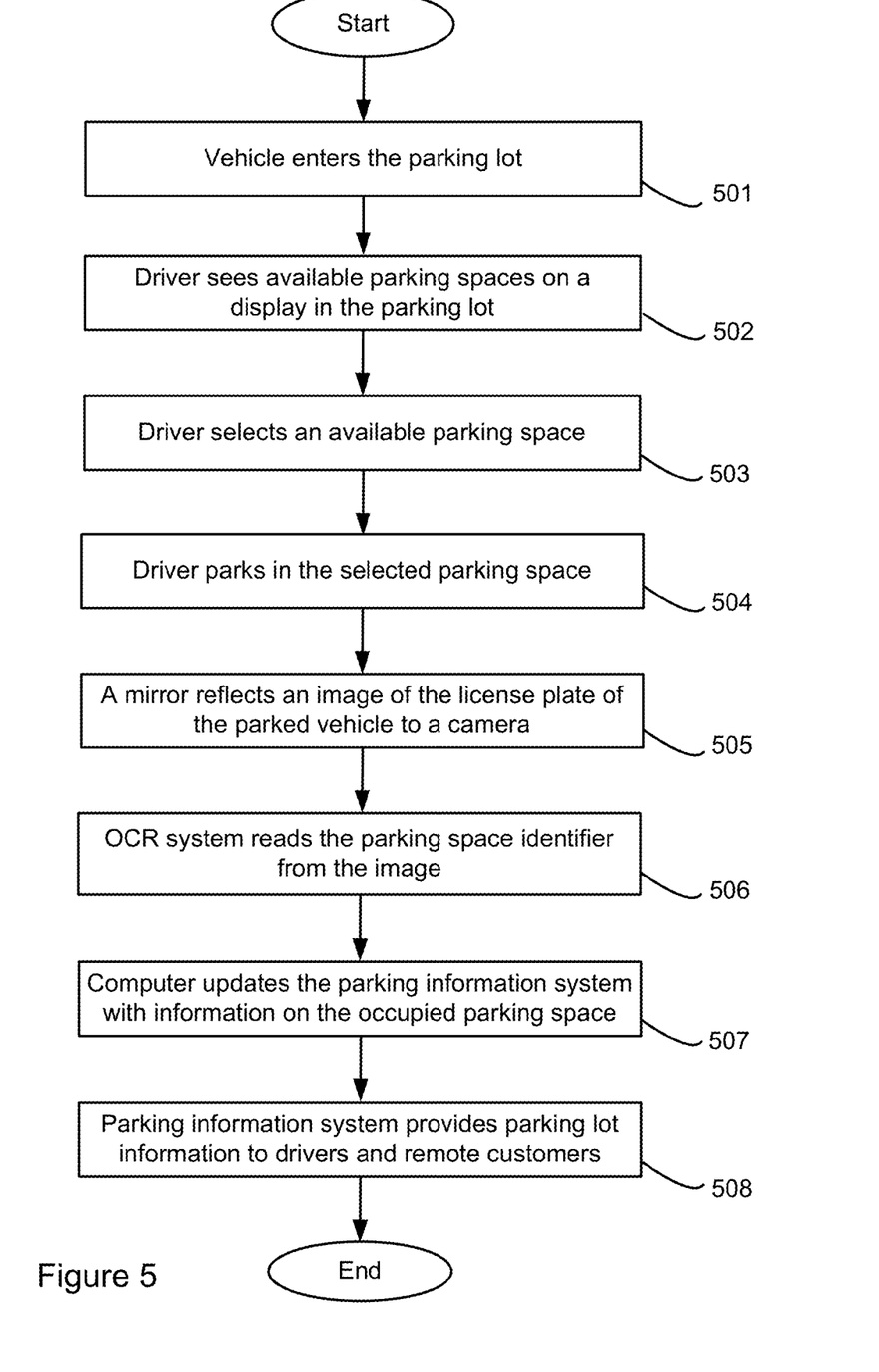
FIG. 5 is a flowchart of a process for identifying and displaying available parking spaces in a parking lot, tracking and displaying information on the parking spaces, according to an exemplary embodiment of the invention.

FIG. 5 illustrates a flowchart of a process for identifying and displaying available parking spaces in a parking lot, according to an exemplary embodiment of the invention. The process may begin at step 501 when a vehicle enters the parking lot. Through a display 108 located in the parking lot, the driver may immediately see where the currently available parking spaces in the parking lot are and their parking space identifiers (e.g., the parking space identifier B2 in FIG. 2), at step 502. The driver may select one of the available parking spaces from the display 108 (step 503) and proceed to park in one of the available parking spaces shown on the display 108 (step 504). The occupancy status of each parking space in the parking lot is available to on-site customers as well as to remote customers through networks connected to the parking lot information system. For example, remote customers may check for space availability at a parking lot through office workstations, portable computers, mobile communication devices with embedded computers and applications.

A mirror 203 at the selected parking space reflects the license plate of the parked car to a camera 205, at step 505. Optical character recognition system 206 may read the identifier of the occupied parking space from the image, at step 506, and send the parking space identifier to a computer 312 for processing. The computer 312 may update a parking lot information database with the current status of the now occupied parking space associated with the received space identifier, for example, from being "available" to "occupied", at step 507.

The parking lot information system then sends the updated status of the now occupied parking space to display 108 and remote customers through networks connected to the parking lot information system 420, at step 508. The updated status of the parking space is thus available to on-site customers as well as remote customers through office workstations, portable computers, and mobile communication devices with embedded computers and applications that can access the parking information system through computer networks. The availability of parking information to remote customers through computer networks also provides the customers the peace of mind when they leave their cars for an extended period of time, such as at an airport parking lot.

Figure 6:
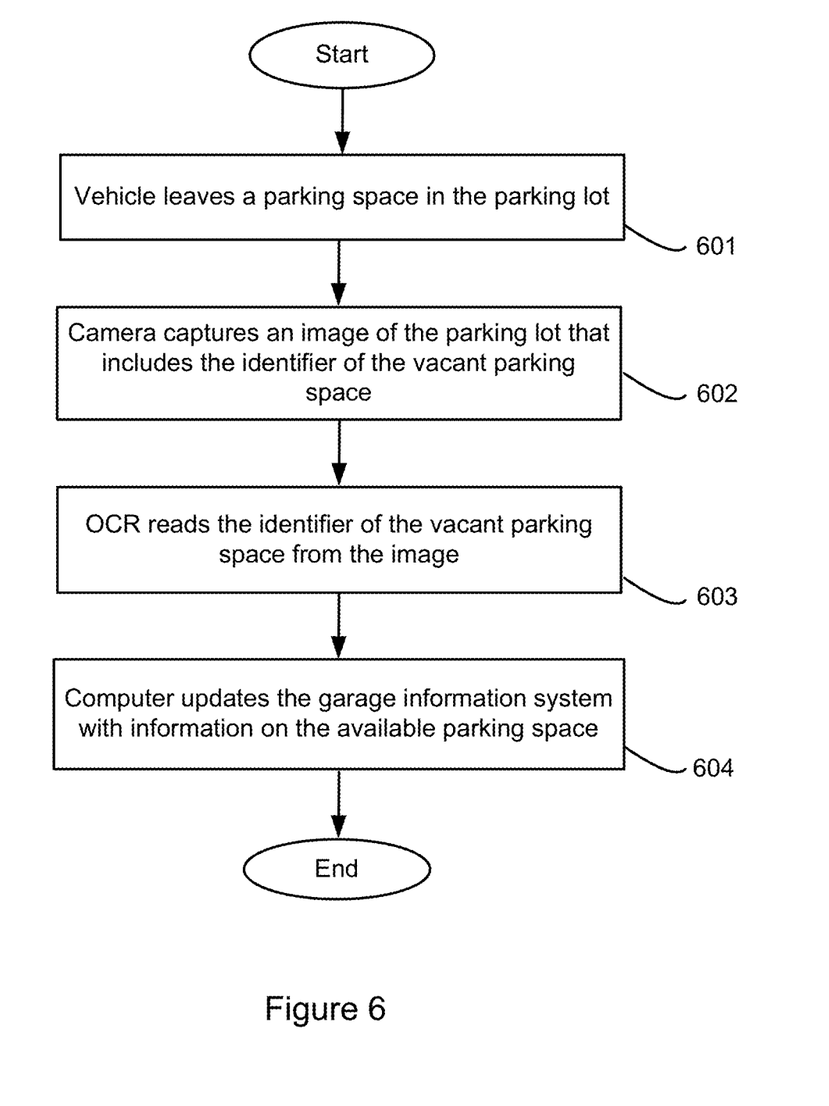
FIG. 6 illustrates a flowchart of a process identifying and displaying parking spaces that become available in a parking lot, according to an exemplary embodiment of the invention.

FIG. 6 illustrates a flowchart of a process identifying and tracking of the parking spaces that become available in a parking lot, according to an exemplary embodiment of the invention. The illustrated process may start at step 601 when a vehicle leaves a parking space to exit the parking lot. As the vehicle leaves the parking space, the identifier of the parking space becomes visible to a camera 205, at step 602. The optical character recognition component 206 of the parking lot information system may analyze an image from the camera to read the space identifier of the now vacant space and send the space identifier to computer 312, at step 603. The computer 312 may then update the status of this parking space from "occupied" to "available", per step 604.

Figure 7:
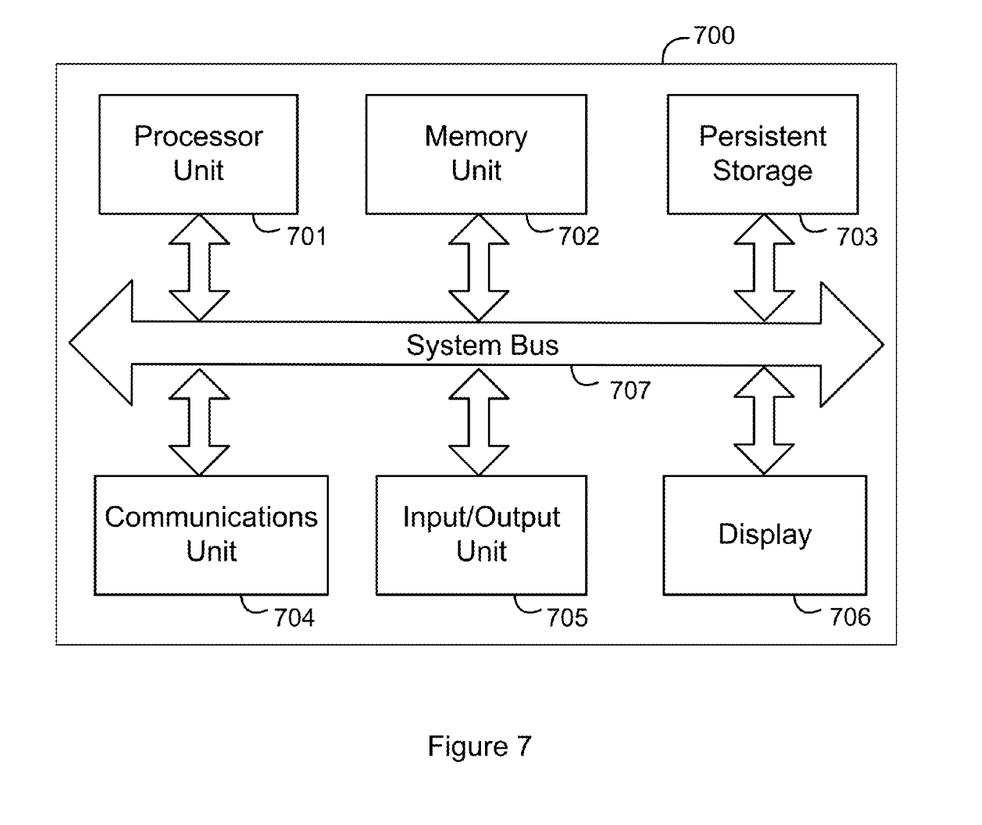
FIG. 7 is a block diagram of functional components in a computer system in which aspects of the invention may be implemented, according to an exemplary embodiment of the invention.

FIG. 7 is a block diagram of the functional components in a computer in which aspects of the invention may be implemented, according to an exemplary embodiment of the invention. Computer 700 includes a processor 701, a memory 702, a persistent storage 703, a communications unit 704, an input/output unit 705, a display 706, and system bus 707. As an example, processor unit 701 may include one or more processing cores and computer memory 702 may comprise EEPROM memory modules. Communications unit 704 may include network interface adapters, modems and support software. Input/output unit 705 may include a keyboard, mouse, and printer. Persistent storage 703 may comprise a hard disk drive or an optical disk drive.

Computer programs are typically stored in persistent storage 703 until they are needed for execution, at which time the programs are brought into memory unit 702 so that they can be directly accessed by processor unit 701. Processor 701 selects a part of memory 702 to read or write based on an address in memory 702 provided along with a read or write request. Usually, the reading and interpretation of an encoded instruction at an address causes processor 701 to fetch a subsequent instruction, either at a subsequent address or some other address.

An operating system runs on processor unit 701 to coordinate and control various components within computer 700 and to perform system tasks required by applications running on the computer 700. The operating system may be a commercially available or open source operating system, as are well known in the art.

Instructions for the operating system and applications or programs may be stored are located on storage devices, such as a hard disk drive 703. These instructions and may be loaded into main memory 702 for execution by processor 701. The processes of the illustrative embodiments may be performed by processor 701 using computer implemented instructions, which may be located in memory 702. Some of the processes may read from or write data to a data storage device such as hard disk drive 703.

The system components shown in FIG. 7 can be varied from the illustrative examples shown. In some illustrative examples, computer system 700 may be a personal digital assistant (PDA) configured with flash memory to provide a non-volatile memory for storing operating system files and/or user-generated data. Additionally, computer system 700 can be a tablet computer, laptop computer, or a computer-embedded communication device.

The subject matter described above is provided by way of illustration only and should not be construed as limiting. Various modifications and substitutions of the described components and operations can be made by those skilled in the art without departing from the spirit and scope of the present invention defined in the following claims, the scope of which is to be accorded the broadest interpretation so as to encompass such modifications and equivalent structures. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, a "memory stick", optical media, magneto-optical media, CD-ROM, etc.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, elector-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present disclosure may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN), Ethernet, or the connection may be made to an external computer, for example, through the Internet using an Internet Service Provider.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures described above illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A parking lot information system, comprising:
a plurality of visual identifiers each marking a parking space in a parking lot;
a digital camera for obtaining an image of parking spaces in the parking lot;
a mirror arrangement within each of the parking spaces, wherein the minor arrangement reflects an image of a license plate of a vehicle parked in a corresponding parking space to the digital camera, and wherein the minor arrangement is associated with a visual identifier of the parking space;
a computer coupled to the digital camera for updating parking information associated with the parking lot by recognizing the identifiers, wherein the identifiers are recognized based on at least one of the image of the parking spaces and the image of the license plate; and a display coupled to the computer for displaying the updated parking information.

2. The system of claim 1, wherein the parking information comprises available parking spaces information and occupied parking spaces information.

3. The system of claim 1, wherein the computer recognizes the parking space identifiers using optical character recognition.

4. The system of claim 1, wherein the parking space identifiers comprise characters marking the parking spaces.

5. The system of claim 1, wherein the computer records a license plate of a car in a parking space, parking time, and parking duration of the car.

6. The system of claim 1, wherein the parking information comprises at least one of parking space location information, parking space identification information, and number of the available parking spaces.

7. The system of claim 1, wherein the display provides a layout of the parking lot.

8. The system of claim 1, wherein the computer is coupled to a network to provide information on the parking lot to remote customers through the network.

9. A computer implemented method comprising:
   obtaining an image of a parking lot by a camera, the parking lot including a plurality of parking spaces each marked by a visual identifier;
   obtaining an image of a vehicle license plate, reflected from a minor arrangement, wherein the mirror arrangement is associated with the visual identifier of one of the plurality of parking spaces where the vehicle is parked;
   identifying available parking spaces and occupied parking spaces in the parking lot based on at least one of the image of the parking lot and the image of the vehicle license plate; and
   displaying information on the available parking spaces and the occupied parking spaces.

10. The method of claim 9, wherein the parking space identifiers are recognized using optical character recognition.

11. The method of claim 9, wherein the parking space identifiers comprise characters marking the respective parking spaces.

12. The method of claim 9, further comprising providing a minor arrangement to reflect an image of a car license plate to the camera.

13. The method of claim 9, further comprising recording a license plate of a car in a parking space, parking time, and parking duration of the car.

14. A computer program product comprising a non-transitory computer readable storage medium having computer readable program code embodied therewith, the computer readable program code comprising:
   computer readable program code, stored in the non-transitory computer readable storage medium, configured to obtain an image of the parking lot by a camera, the parking lot including a plurality of parking spaces each marked by a visual identifier;
   computer readable program code, stored in the non-transitory computer readable storage medium, configured to obtain an image of a license plate of a vehicle parked in a corresponding parking space, reflected from a mirror arrangement wherein the minor arrangement is associated with a visual identifier of the corresponding parking space;
   computer readable program code, stored in the non-transitory computer readable storage medium, configured to identify available parking spaces in the parking lot by recognizing at least one of the image of the parking lot or the image of the license plate of the vehicle, the recognition being done by a computer coupled to the camera; and
   computer readable program code, stored in the non-transitory computer readable storage medium, configured to display information on the available parking spaces and the occupied parking spaces.

15. The computer program product of claim 14, wherein the computer readable program code comprises computer readable program code configured to display a layout of the parking lot.

16. The computer program product of claim 14, wherein the computer readable program code comprises computer readable program code configured to recognize the parking space identifiers using optical character recognition.

17. The computer program product of claim 14, wherein the computer readable program code comprises computer readable program code configured to provide information about the parking lot to remote customers through a network.

18. The computer program product of claim 14, wherein the information includes parking time, duration, and parking space identification.

19. The computer program product of claim 14, wherein the information comprises parking space location information, parking space identification, and the number of the available parking spaces.

20. The computer program product of claim 14, wherein the computer readable program code comprises computer readable program code configured to record a car license plate, associated parking space identifier, parking time, and parking duration.

* * * * *